US005874787A

United States Patent [19]

Meyer et al.

[11] Patent Number: 5,874,787

[45] Date of Patent: Feb. 23, 1999

[54] ISOLATION AND POSITIVE SHUT-OFF SYSTEM FOR A FUEL DISPENSING FACILITY

[76] Inventors: Martin A. Meyer; Mickey A. Meyer, both of 601 Hwy. 8 P.O. Box 416, Silver Grove, Ky. 41085

[21] Appl. No.: 584,802

[22] Filed: Jan. 11, 1996

[51] Int. Cl.[6] .................................. H02J 1/00; B67D 5/00

[52] U.S. Cl. ............................ 307/39; 307/118; 307/139; 222/23; 222/25

[58] Field of Search ...................................... 307/112, 118, 307/139, 140, 11, 38, 39; 222/1, 23, 25, 36, 71, 134, 129, 330, 3

[56] References Cited

U.S. PATENT DOCUMENTS 5,372,032 12/1994 Filippi et al. ........................ 73/40.5 R
5,375,454 12/1994 Andrejasich et al. ............... 73/40.5 R
5,630,528 5/1997 Nanaji ........................................ 222/1

*Primary Examiner*—Jeffrey Gaffin
*Assistant Examiner*—Jonathan S. Kaplan
*Attorney, Agent, or Firm*—Dinsmore & Shohl LLP

[57] ABSTRACT

An isolation and positive shut-off system for a fuel dispensing facility having a plurality of dispensers and at least one fuel storage tank in electrical communication with one or more of the dispensers is provided comprising a power source for supplying a power signal to the dispensers and fuel storage tanks, a plurality of relays connected between the dispensers and the storage tanks and power source for selectively interrupting the electrical communications and power signals to each of the dispensers, a control signal for the relays, and a plurality of switches for independently and selectively controlling transmission of the control signal to the relays in order to trigger the relays to separately interrupt transmission of the power signal and electrical communications to each of the dispensers.

13 Claims, 7 Drawing Sheets

ISOLATION AND POSITIVE SHUT-OFF SYSTEM FOR A FUEL DISPENSING FACILITY

TECHNICAL FIELD

The present invention relates to a power voltage control system for fuel dispensing facilities, and more particularly, to a positive isolation and shut-off system for a service station or other fuel dispensing facility which enables power to one or more of the fuel dispensers at the station to be separately shut-off, and the dispenser to be operationally isolated, without effecting the operation of the remaining dispensers at the station.

BACKGROUND OF THE INVENTION

Presently, many convenience stores and service stations are of the "self-service" type, which contain dispensers for dispensing fuel products, such as gasoline or kerosene, upon the request of a customer. These stations typically have a number of fuel dispensers so that more than one customer may be serviced at a time. In addition, each of the dispensers typically includes a number of nozzles which are each connected to a separate fuel storage tank, or else includes a single nozzle with access to more than one fuel storage tank in order to dispense a number of different fuel products. To operate the dispenser, a customer activates an on/off lever or a start button to enable fuel to flow from the designated underground tank, through a fuel line, to the dispenser, and out the nozzle to a waiting vehicle or container.

At these types of refueling stations, there is typically a single control panel for controlling the operation of all of the dispensers at the station. This panel is typically operated by a station attendant from the interior of the station or store. This panel may contain controls for setting and clearing the dispensers, as well as registering the amount of fuel dispensed from each dispenser.

One problem that has arisen with these multi-dispenser service stations is that when a single dispenser requires servicing, or in the case of an accident such as a dispenser being struck by a vehicle, isolation and shut-down of all power to the individual malfunctioning or damaged dispenser cannot be accomplished without also shutting down the power to the rest of the dispensers at the station. A complete shut-down of the station, even for short periods of time, is very undesirable since during the shut-down period no fuel sales and thus no revenue generation can occur. However, by law, all fuel dispensing stations are required to have an emergency shut-off system for immediately disconnecting power to a damaged or malfunctioning dispenser in order to eliminate the risk of fire or electric shock. Without a mechanism to isolate and separately shut-off an individual dispenser, the only way to satisfy this requirement and safely repair a damaged dispenser is to shut-down all power to all of the dispensers, thus rendering the entire station inoperable.

In the past, emergency shut-down systems were primarily mechanical and relied upon mechanical switches to break the power connections to the fuel dispensers. More recently, emergency shut-off systems have been developed wherein a single stop switch with annunciator is attached to the station control panel to provide for a true isolation of all of the fuel dispensers in the case of an urgent situation at the pumps. In these types of systems, which operate on DC power, relays rather than mechanical switches are used to break the AC connections to the dispensers, thereby disconnecting the power to the dispensers. While these systems are beneficial in that they enable the emergency stop to be activated directly from the station control panel, they too have a number of problems. In particular, these systems still require that all of the dispensers at a particular station be shut-down in order to disable a single dispenser, even if only one dispenser is damaged or in need of servicing.

To avoid the financial consequences of a complete station shut-down when only a single dispenser needs repair, some station operators have resorted to disabling a breaker for the targeted dispenser to disable power to that dispenser. However, this practice is risky, since it may be difficult to determine whether the correct breaker has been disabled. Further, it may be possible for backfeed power from the underground pumps for the fuel tanks to migrate back to the supposedly "isolated" dispenser, when another dispenser connected to that same tank is operated, creating, a hazardous situation.

Thus, a need exists for a lock-out, tag-out, true isolation system for a fuel dispensing facility which enables not only the emergency shut-down of all of the dispensers at the facility, but also the isolation and shut-off of power to each dispenser individually, so that an individual dispenser can be shut-down for service or repair without interrupting the operation of the rest of the station.

SUMMARY OF THE INVENTION

Accordingly, it is a principal object of the present invention to provide a safe and effective system for controlling the power supply to a number of individual fuel dispensers at a multidispenser fuel dispensing facility or service station. In particular, it is an object of the present invention to provide a system which enables the safe, quick and efficient isolation and positive shut-off of power to one or more of the dispensers individually, without the need to shut-down power to the entire refueling station.

Another object of the present invention is to provide a system for the remote emergency control of the power source for fuel dispensers.

Yet another object of the present invention is to provide a system which complies with governmental regulations for the emergency shut-off of power and isolation of fuel dispensers.

Still another object of the present invention is to provide a positive shutoff system which can be easily retrofitted to conventional fuel storage tanks, fuel dispensers and power supplies without the need for special or additional equipment.

A further object of the present invention is to provide a system which prevents cross-phasing between the dispenser power lines.

A further object of the present invention is to provide an isolation and shut-off system for a fuel dispensing facility which enables the simple, quick shut-down of either the entire station or only selected dispensers at the station.

It is a further object of the present invention to provide a system which enables the complete isolation of a fuel dispenser from both forward and backfeed power when in a shut-down condition.

It is an additional object of the present invention to provide both a positive shut-off system and an emergency stop in a single, completely wired system.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects, and in accordance with the purposes of the present invention, a system is provided for isolating individual dispensers at a fuel dispensing facility by enabling power to one of the dispensers to be shut off individually without affecting the operation of the remaining dispensers at the facility. Preferably, a plurality of dispensers are provided and the dispensers are connected to a power source and to a plurality of storage tanks through a control unit. In the preferred embodiment, the control unit includes relays for each dispenser, and a switch is provided for each dispenser for control over the relays for the dispenser. A generation unit generates a DC control signal from the power signal, and this control signal is selectively supplied to the relays for the dispenser by the switch associated with the dispenser. In this embodiment, when the switch for a dispenser is thrown, the DC control signal to the relays for the dispenser is interrupted and the relays switch to the open state, thereby severing the lines between the source and the dispenser, as well as the lines between the storage tank and the dispenser. Accordingly, the signal from the power source is prevented from traveling to the dispenser and signals are prevented from traveling between the dispenser and the tank. The other dispensers, however, remain unaffected and ready for use. Thus, the system provides the isolation and shut-off of power to each dispenser individually, so that an individual dispenser can be shut-down for service or repair without interruption the operation of the rest of the station.

To achieve the foregoing and other objects, and in accordance with the purposes of the present invention, a system is provided for isolating individual dispensers at a fuel dispensing facility by enabling power to one of the dispensers to be shut off individually without affecting the operation of the remaining dispensers at the facility. Preferably, a plurality of dispensers are provided and the dispensers are connected to a power source and to a plurality of storage tanks through a control unit. In the preferred embodiment, the control unit includes relays for each dispenser, and a switch is provided for each dispenser for control over the relays for the dispenser. A generation unit generates a DC control signal from the power signal, and this control signal is selectively supplied to the relays for the dispenser by the switch associated with the dispenser. In this embodiment, when the switch for a dispenser is thrown, the DC control signal to the relays for the dispenser is interrupted and the relays switch to the open state, thereby severing the lines between the source and the dispenser, as well as the lines between the storage tank and the dispenser. Accordingly, the signal from the power source is prevented from traveling to the dispenser and signals are prevented from traveling between the dispenser and the tank. The other dispensers, however, remain unaffected and ready for use. Thus, the system provides the isolation and shut-off of power to each dispenser individually, so that an individual dispenser can be shut-down for service or repair without interruption the operation of the rest of the station.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different, obvious aspects all without departing from the invention. Accordingly, the drawings and description should be regarded as illustrative in nature and not as restrictive.

DETAILED DESCRIPTION OF THE PREFERRED EMBODIMENT

Figure 1:
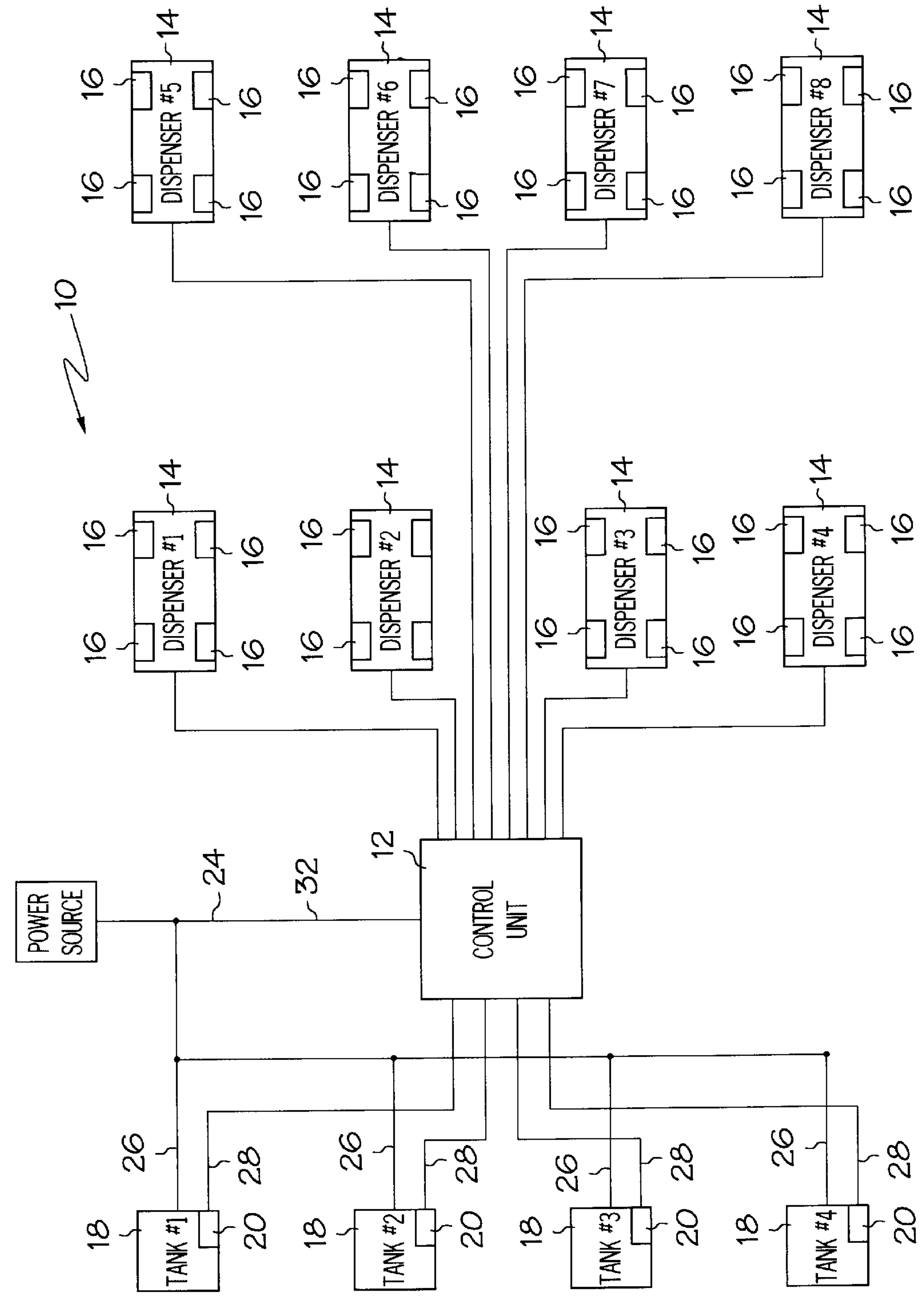
FIG. 1 is a block diagram of a refueling station incorporating a control system according to the present invention.

Referring now to the drawings, FIG. 1 illustrates a block diagram of a service or fueling station, designated generally as 10, equipped with a power control system 12 of the present invention. FIGS. 1–4 illustrate one preferred embodiment of the invention, in which the control system 12 is configured to control the power supply for a fueling station having eight dispensers, identified by reference number 14, with four pumps or nozzles 16 per dispenser, for dispensing four different products at each dispenser. However, it is to be understood that the system of the present invention can also be employed at service or fueling stations having a greater or lesser number of dispensers, and nozzles per dispenser, without departing from the scope of the invention.

As shown in FIG. 1, a typical fueling station includes a number of storage tanks 18 for storing the various fuel products sold at the station. These tanks 18 enable the fuel products to be delivered to the station 10 in bulk quantities and stored for later disbursement in smaller quantities to individual customers. These storage tanks 18 are normally located underground, and each contains a different type of fuel product. Each of the tanks 18 is connected by way of fuel hoses and electrical lines to one or more dispensers 14 for dispensing their respective products Each tank 18 also includes a pump 20 for controlling the delivery of fuel from the tank. Pumps 20 enable the fuel to be transmitted from the tanks 18, through fuel hoses (not shown), and ultimately to the particular dispenser requesting the fuel.

Figure 2A:
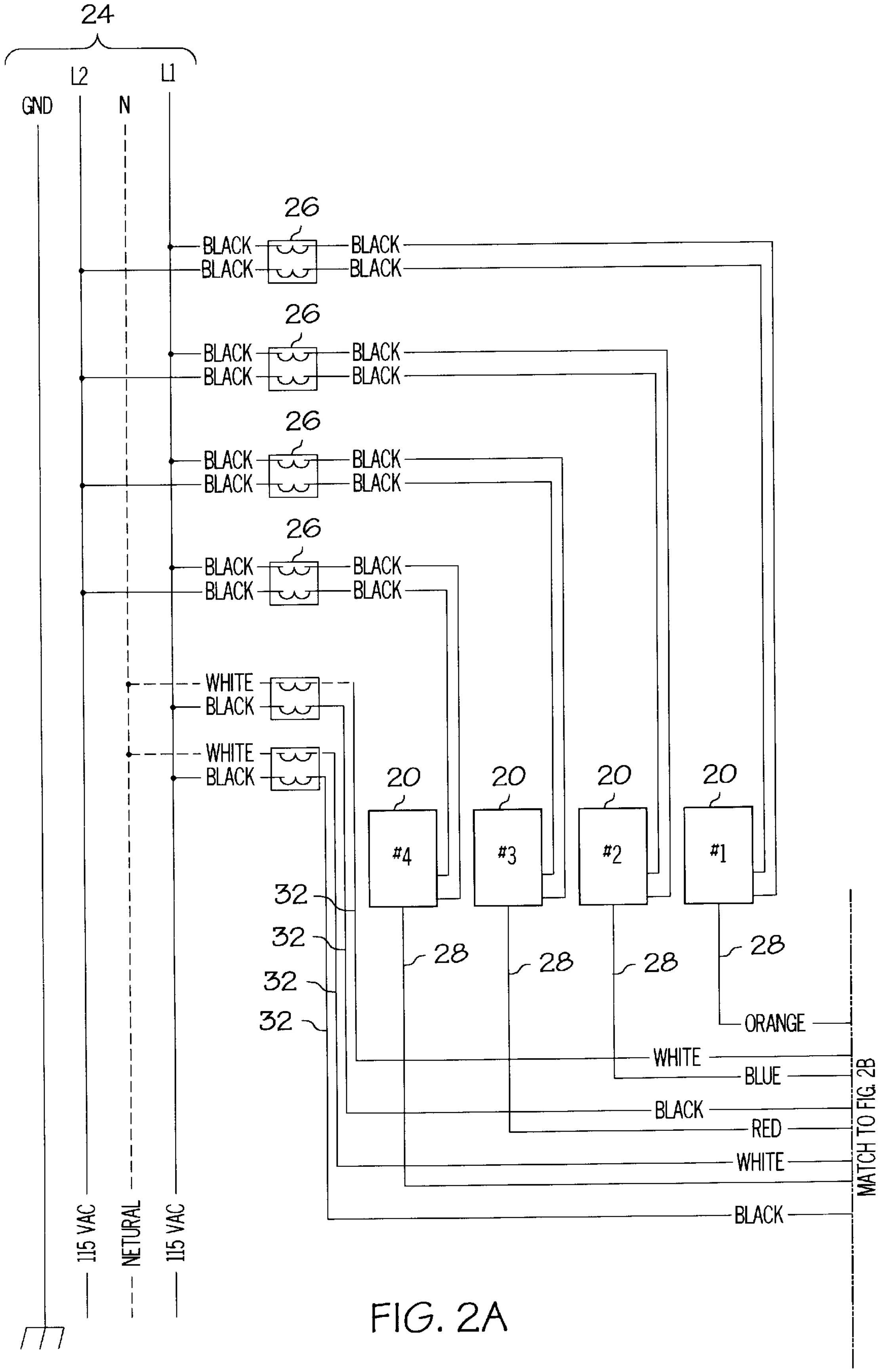
FIG. 2 is a schematic diagram depicting the power connections between the fuel tank motors and control system of the present invention.
Figure 2B:
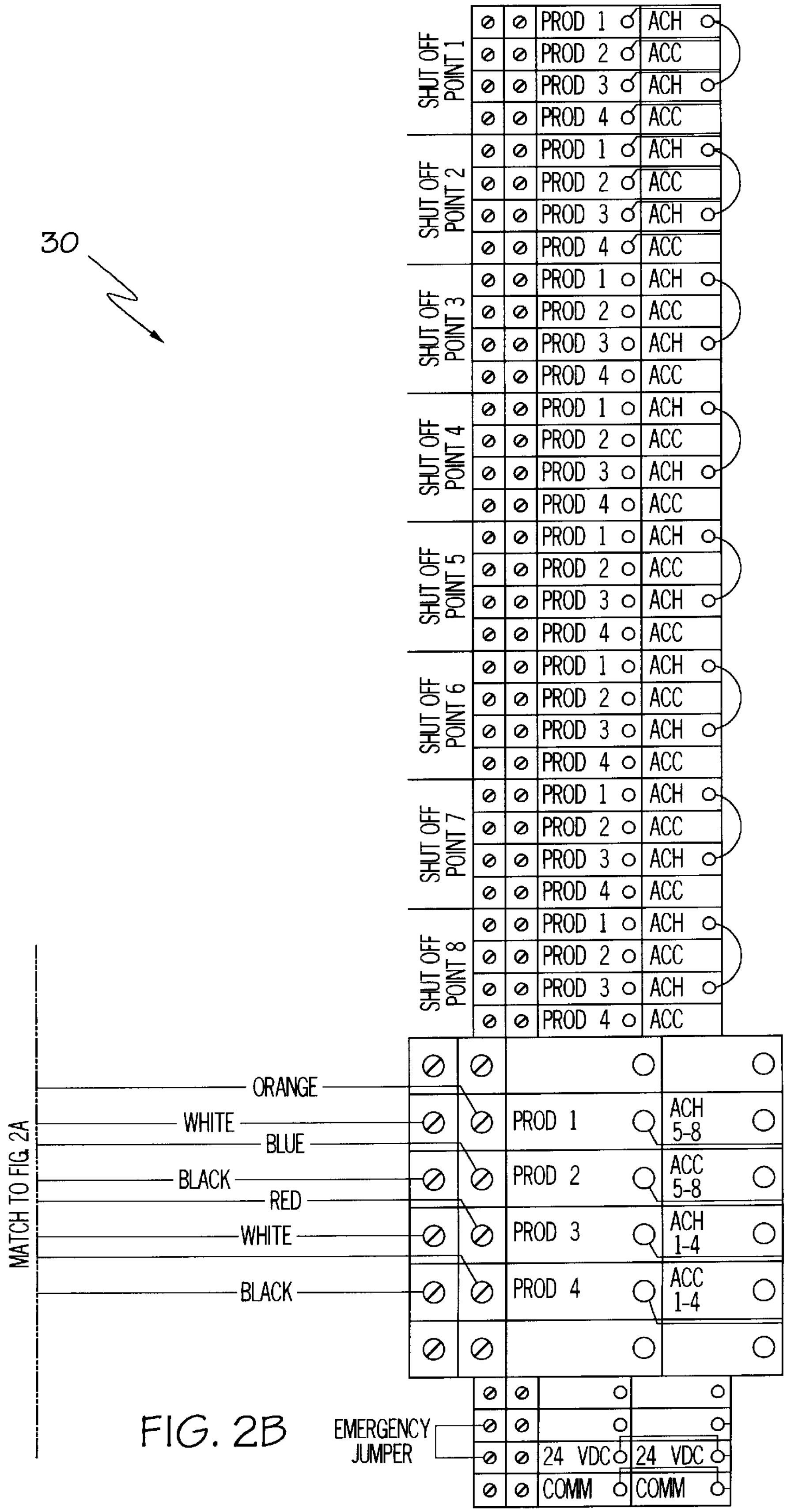

As shown in FIG. 2, power is preferably supplied to each of the underground tank pumps 20 from the main AC power lines 24 for the station. Power is also transmitted from the main station line 24 to each of the dispensers to power the dispenser lights and controls. In addition, control signals are transmitted between the dispensers and pumps in order to operate the pumps. Typically, power is continuously supplied to each dispenser while the dispenser is in service. When a request for fuel is made at a particular dispenser, a control signal is transmitted from the dispenser to the tank containing the requested fuel in order to turn on the tank pump and pump fuel. In the present invention, the control signals for the tank pumps 20, as well as the dispenser power signal from the main line 24, are transmitted via the control system 12. In this manner, the control system 12 of the present invention is connected in series with the pumps 20 and dispensers 14 of FIG. 1 for effecting the transmission of signals between the two and to provide a means for quickly and safely isolating any or all of the dispensers. The series arrangement also enables the control system 12 to be easily retrofitted to existing fueling stations without the need for costly new equipment, since the system can be installed directly into existing connections extending between conventional pumps 20 and dispensers 14 as shown in FIG. 1.

FIG. 2 depicts the connections between the main power lines 24, tank pumps 20 and control system 12 of the present invention in further detail. As shown in FIG. 2, AC power is supplied to each of the tank pumps 20 from the main power distributions lines 24 for the station via circuit breakers 26. In addition, control signals from the dispensers are transmitted to each pump 20 via lines 28 from control system 12. Power for the dispensers is also supplied to the system 12 by lines 32. Control system 12 is partially depicted in FIG. 2 in order to illustrate the connections between the power supply, fuel tank pumps and control system. Within the control system 12 is located a terminal strip 30 for facilitating connections within the system. In addition to connections 32 for the power signal, and connections 28 to the tank pumps 20, strip 30 also includes connections to each of the dispensers at the station. These connections are identified as shut-off points in the figures. Each dispenser shut-off point includes a contact for each product at the dispenser (identified as Prod 1, Prod 2, Prod 3, Prod 4) and power signal contacts (identified as ACH, ACC). In the preferred embodiment, the entire control system 12 is enclosed within an electrical box (not shown) which can be conveniently located adjacent the other control panels for the station.

Figure 3A:
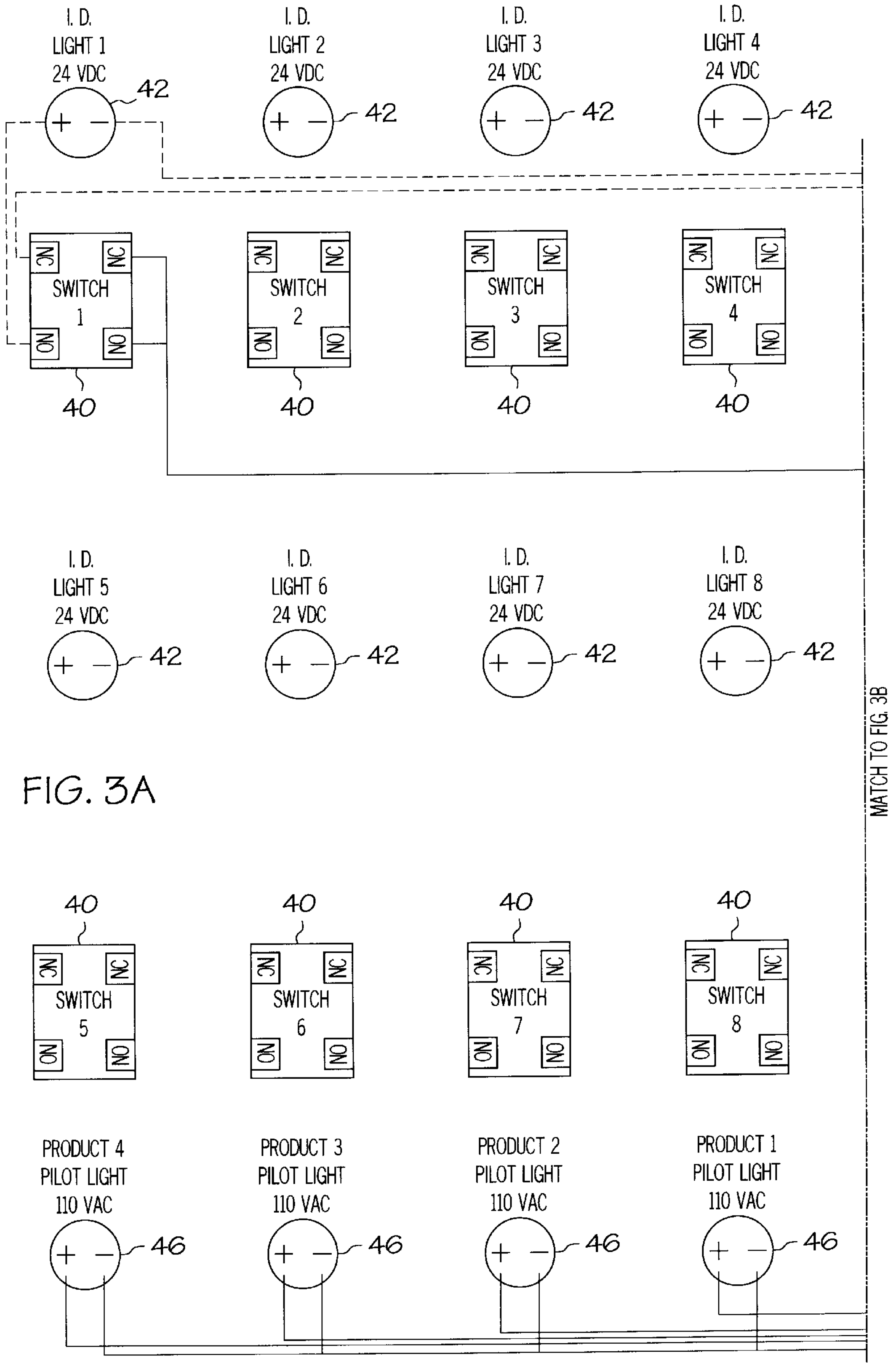
FIG. 3 is a schematic diagram of a control system constructed according to the principals of the present invention.
Figure 3B:
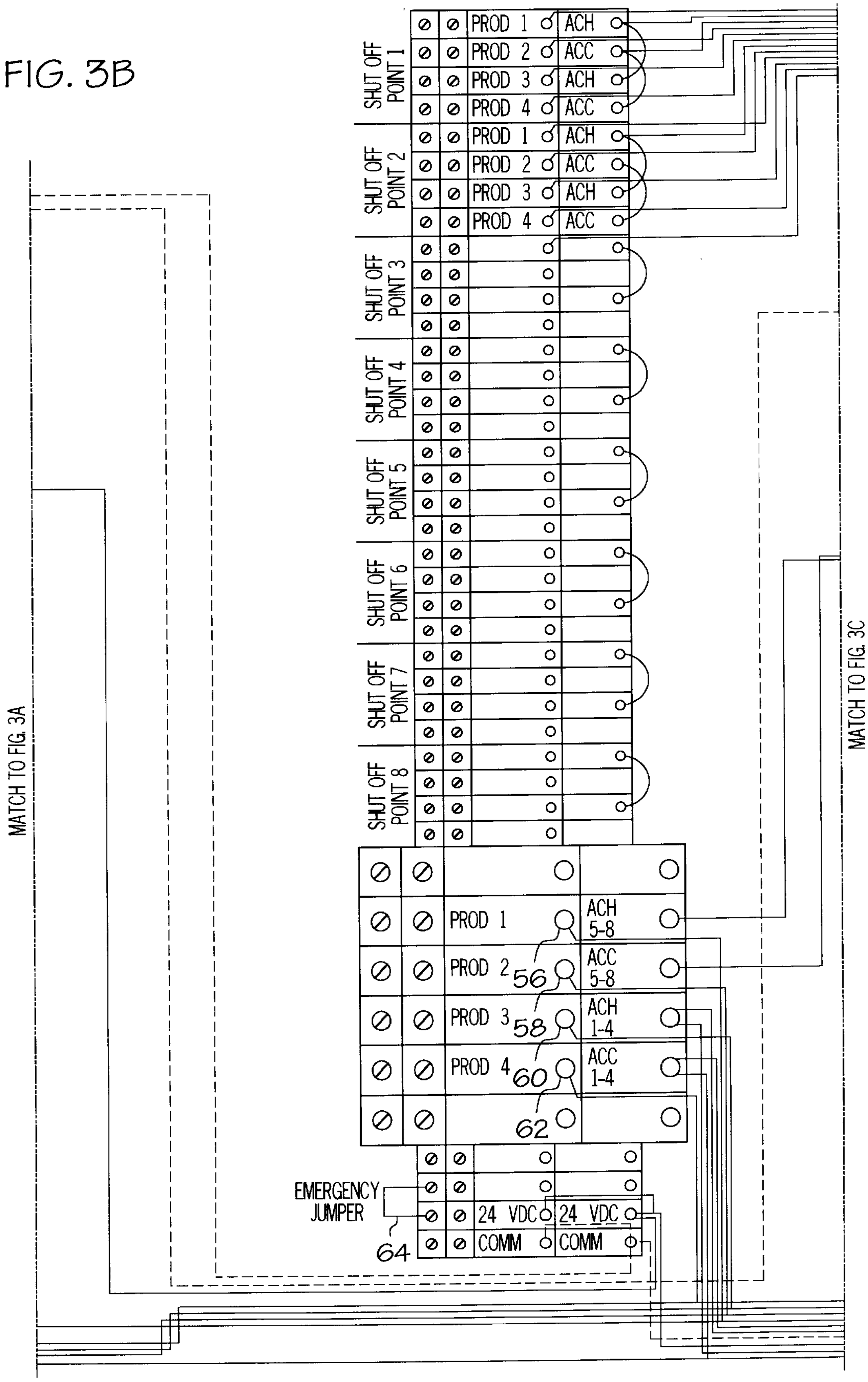
Figure 3C:
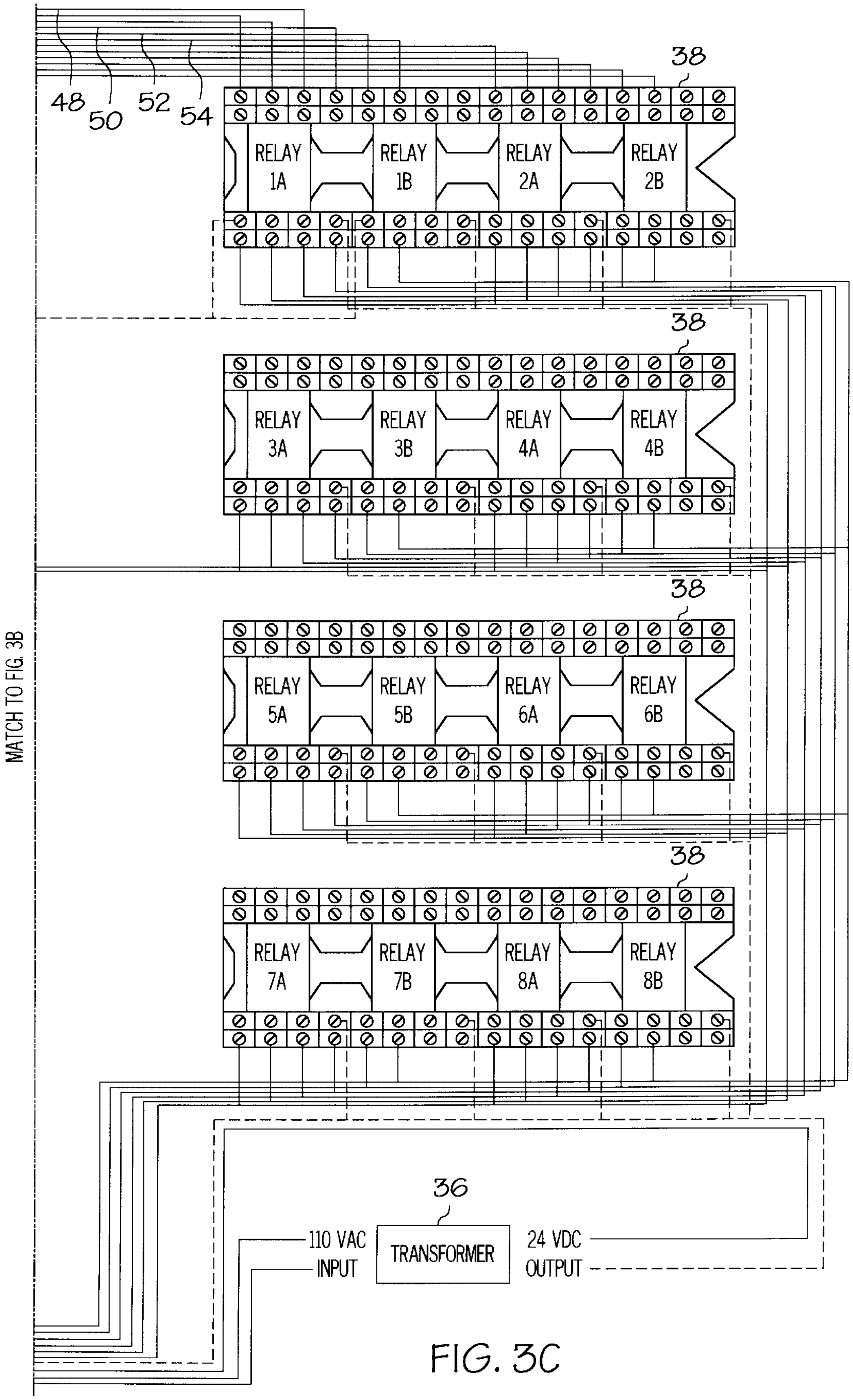

Referring now to FIG. 3, which shows the schematic layout for the control system in further detail, the control system 12 of the present invention includes the terminal strip 30 described above, and a transformer 36. Transformer 36 is preferably a universal AC/DC transformer for converting the AC power signal from terminal strip 30 to a DC signal. In addition to the terminal strip 30 and transformer 36, a number of relays 38 are included in the unit 12. Relays 38 control the connections between the pumps 20, power supply and dispensers 14 to enable the dispensers to be individually isolated as will be described in more detail below. In the preferred embodiment, the relays 38 are 4 contact, DC-controlled relays having 4 AC contact points per relay. In this preferred embodiment, the relays 38 are controlled by the DC signal from the transformer 36 as will be described in more detail below. In the preferred embodiment of the present invention, one relay 38 is provided for every two products or nozzles located at a dispenser. Thus, for the embodiment depicted in the figures, in which eight dispensers with four nozzles per dispenser are provided, two relays are designated for each dispenser. In this embodiment, a total of sixteen relays are utilized to control all of the power connections for the eight dispensers. These relays are identified as 1A, 1B through 8A, 8B in FIG. 3.

Between the dispenser shut-off points and the tank pump connections, each of the product control signals from a dispenser is connected to the relays 38 designated for the dispenser. Thus, as shown in FIG. 3, if the fuel from tank #1 is sold at each dispenser 14, then a connection is made between the Prod 1 contact at each shut-off point and each set of relays 38, and from the relays to the Prod 1 contact point 56. Correspondingly, if a particular fuel product is sold at only one or several of the dispensers, rather than all, then signals for that product would only be connected through the relays designated for the dispensers selling the product.

In addition to the relays 38, terminal strip 30 and transformer 36, the control system 12 also includes a number of switches 40 for controlling the connection of the DC signals to the relays. In the preferred embodiment, one switch 40 is provided for each dispenser 14 to control the isolation of that dispenser. As shown in FIG. 3, the DC signal from transformer 36 is transmitted to each switch 40 via terminal strip 30. When a switch 40 is in an on or closed position, indicating that the associated dispenser is operational, then the DC signal is transmitted from the switch 40 to the relays for the dispenser to energize the relays, and permit power to pass to the dispenser, and control signals to pass between the dispenser and the product tanks 18. If power to a dispenser is to be turned off, then the switch designated for that dispenser is placed in an off or open position. In this position, the DC signal from transformer 36 is not transmitted from the switch to the dispenser's relay pair. This termination of the DC signal to the relays results in a break or interruption in the power and control signals transmitted through the relays. Accordingly, power to the particular dispenser served by those relays is cut-off, and the connections between the tank pumps 20 and the dispenser are severed, preventing any electrical signals from backfeeding through these lines to the dispenser. Thus, the dispenser is electrically isolated from the power source and remaining dispensers at the station. In the preferred embodiment, the lock-out switches 40 are two-position key switches to enable the dispensers to be positively disabled by means of a key, rather than simply a button or lever. These key switches enable the system to meet OSHA requirements for a lock-out isolation system.

A power-off indicator light 42 is preferably associated with each of the switches 40. Each of these indicator lights 42 is preferably placed adjacent to its associated switch 40, in order to provide a visual indication of the position of the switch. As shown in FIG. 3 for switch #1, each of the indicator lights 42 is connected in series between the open output terminal of the associated switch 40 and a common terminal on the power strip, in order to receive DC power and light-up when the switch is in the open position. When the switch is placed in the open position, signaling that the associated dispenser is in an isolated state, the DC signal from the switch is transmitted to the indicator light rather than to the associated relays to provide a visual signal to an operator. For case of illustration, FIG. 3 depicts the connections between the terminal strip 30, switches 40, and lights 42 for only the first switch and pair of relays 1A, 1B. However, it is to be understood that the other switches, lights and relays in the system 12 would be connected in a similar manner in order to control the operation of the other relays and associated dispensers.

In addition to a power signal contact, each relay pair associated with the dispenser also includes a control signal connection for each of the products at the dispensers. FIG. 3 depicts the connections extending from the tank contact points 56, 58, 60 and 62 to the relays 38. In addition FIG. 3 depicts the connections from the first set of relays 1A, 1B, which are associated with the first dispenser to the first shut-off point, and from the second set of relays 2A, 2B, which are associated with a second dispenser to the second shut-off point. These connections are representative of the connections that would be provided for each relay pair and associated dispenser. Accordingly, for ease of illustration, the connections between the terminal strip 30 and the remaining relays 3A, 3B through 8A, 8B have been omitted.

Figure 4:
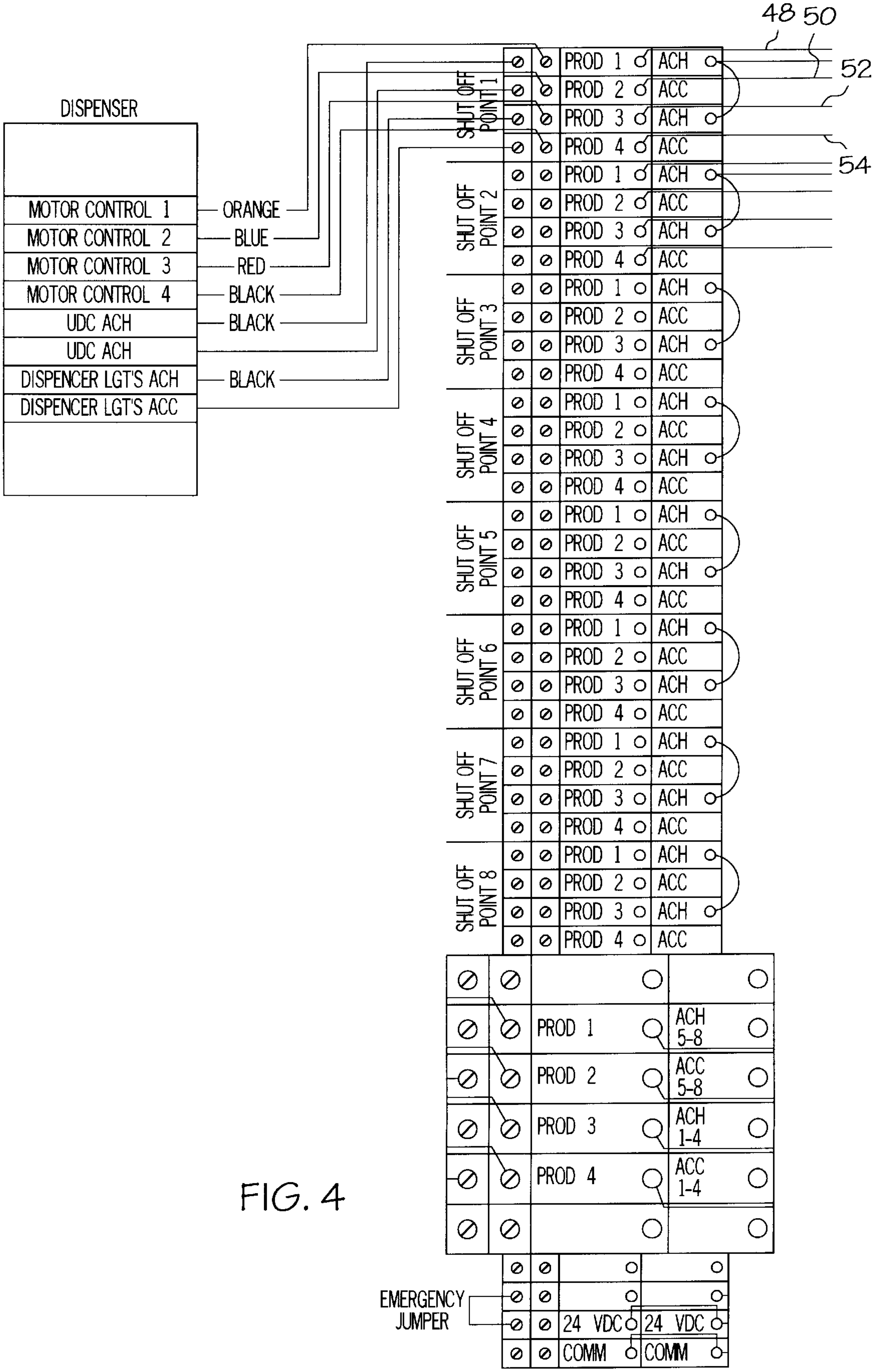
FIG. 4 is a schematic diagram illustrating the power connections between the control system of the present invention and a representative fuel dispenser.

FIG. 4 depicts the power connections between the terminal strip 30 and the dispensers 14 in further detail. For ease of description, only the connections for one dispenser are depicted. However, it is to be understood that the connections for each of the other dispensers at the facility would be configured in a similar manner to enable isolation of any or all of the dispensers. As shown in FIGS. 3 and 4, the control lines 48. 50, 52, 54 from the relay 1A, 1B contacts are connected to the terminal strip 30 at shut off point 1. From the terminal strip 30, each of the control lines is also connected to the dispenser 14. In addition, AC power is supplied to each dispenser via connections on the strip 30 to power the lights and controls for operating the dispenser. Preferably, a single power signal is transmitted to each of the dispenses 14 through strip 30 in order to maintain correct phasing within the system.

The power signal from the terminal strip 30 is also supplied to a number of indicator lights 46. Each of these lights 46 is associated with one of the fuel tanks 18 and is connected to the control lines for that tank. When the tank associated with each light is activated by a dispenser, the control signal from the dispenser is transmitted to the associated light to provide a visual indication that the tank motor is operational. In this manner, the control system provides a visual indication regarding operation of the tanks.

In addition to providing a means to individually isolate each dispenser, the control system 12 may also include a main system shut-off, which would isolate all of the dispensers simultaneously with a single switch. This main system shut-down may be accomplished in the present invention by providing a switch 64 in the DC signal connection to terminal strip 30 as shown in FIG. 3. This switch 64 would interrupt transmission of the DC signal to each of the relays, thereby breaking the connections through the relays.

Accordingly, the present invention provides a power control system for a fuel dispensing facility which utilizes a number of DC-controlled relays in series with the power and control lines extending between the power source, fuel tank pumps and individual dispensers to provide a means for electrically isolating the individual dispensers from the power source, tank motors and other dispensers. With the present invention, electrically isolating a dispenser, such as for repair, can be accomplished simply by activating a single switch in the control unit, thus complying with the applicable electrical codes. Once activated, the switch triggers the relays for that dispenser to disconnect all electrical connections to the dispenser, completely isolating the dispenser. In the present invention, the relays interrupt not only the power signal to the dispenser, but also the signal lines from the dispenser to each of the fuel storage tanks, thereby preventing any backfeed power from reaching the dispenser from the fuel tanks. In addition, in the present intention, each dispenser can be individually isolated by means of its associated switch without effecting the operation of the other dispensers at the station. The present invention can also be easily retrofitted to existing fueling stations and dispensing facilities by connecting the system in series with the existing power lines extending between the tank motors and dispensers, thus avoiding the need for an expensive overhaul or new equipment. By providing both a positive shut-off of individual dispensers and an emergency stop system, the present invention provides a complete wiring system all in one unit.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A system for selectively and individually, electrically isolating one of a plurality of dispensers at a fuel dispensing facility having at least one fuel storage unit connected to said dispensers, said system comprising:

- a power source for transmitting a power signal to each of said dispensers;
- a generation device for generating a control signal from said power signal;
- a plurality of power transmission circuits, each power transmission circuit being disposed between a dispenser and said power source for transmitting said power signal therebetween, each of said circuits including an interruption device for interrupting said transmission of said power signal to said dispenser; and
- a plurality of switches, each switch being adapted for selectively applying said control signal to an interruption device, each interruption device being responsive to said control signal to selectively interrupt said transmission of said power signal to said dispenser.

2. The system of claim 1 wherein each switch is associated with one dispenser, and wherein the system further comprises a plurality of communication circuits, each communication circuit being disposed between said storage unit and a dispenser for transmitting a demand signal therebetween, wherein each of said communication circuits includes an interruption device, each switch being further adapted for selectively applying said control signal to the interruption device of the communication circuit for preventing the transmission of said demand signal between said dispenser and said storage unit.

3. The system of claim 2 wherein said interruption devices are current-controlled switches.

4. The system of claim 3 wherein said interruption devices are relays.

5. The system of claim 4 wherein said relays are DC-controlled, and said control signal is a DC signal.

6. The system of claim 5 further comprising a master switch for interrupting said control signals to all of said interruption devices and thereby preventing transmissions of said power signals and demand signals for all of said dispensers in a single step.

7. The system of claim 6 wherein said generation device is a transformer for generating said DC signal from said power signal.

8. The system of claim 1 further comprising:

- a plurality of communication circuits, each communication circuit connecting each of said dispensers with a storage unit for transmitting demand signals therebetween wherein each of said interruption devices is disposed on a power transmission circuit and a communication circuit for selectively interrupting the transmission of a demand signal and a power signal to a dispenser upon the interruption of said control signal to the interruption device by a switch.

9. A system for selectively, electrically isolating one or more of a plurality of dispensers at a fueling station having at least one fuel storage unit connected to said dispensers, said system comprising:

- a source for generating a power signal for said dispensers;
- a transformer for generating a control signal from said power signal;
- power transmission lines for transmitting said power signal between said source and said dispensers, said lines including a plurality of relays for selectively controlling transmission of said power signal to said dispensers; and a plurality of switching devices, wherein each switching device is adapted for selectively applying said control signal to less than all of the relays to selectively interrupt transmission of said power signal to less than all of said dispensers.

10. The system of claim 9 wherein each of said plurality of relays controls transmission of said power signal to a single dispenser, and each of said plurality of switching devices controls the application of said control signal to a single relay.

11. The system of claim 8 wherein each switching device is associated with one of said dispensers, and wherein the system further comprises:

a plurality of communication lines, each communication line connecting each of said dispensers with each of said storage units for transmitting demand signals therebetween wherein said relays are disposed on said power transmission lines and said communication lines, each relay being electrically connected to one of said switching devices for selectively severing the power transmission lines and communication lines for a dispenser upon the interruption of said control signal by said switching device.

12. A method for selectively electrically isolating one of a plurality of fuel dispensers at a fuel dispensing facility, comprising:

providing a plurality of fuel dispensers;

providing a power transmission line for each dispenser to connect the dispenser with a power signal from a power source;

providing a relay on each power transmission line;

providing a switching device for each relay;

generating a control signal from the power signal;

applying the control signal to the relays on the power transmission lines to close the power transmission lines and allow the power signal to reach the dispensers; and actuating one switching device to interrupt the transmission of the control signal to one relay and to thereby open one transmission line and prevent the power signal from reaching one dispenser while allowing the power signal to continue to be transmitted to the remaining dispensers.

13. The method as recited in claim 12, further comprising:

providing a communication line for each dispenser to connect the dispenser with a storage unit;

providing a relay on each communication line;

applying the control signal to the relays on the communication lines to close the communication lines and allow demand signals to flow from the dispensers, wherein the actuation of the switching device also interrupts the transmission of the control signal to a relay on a communication line to thereby prevent the demand signal to flow from one dispenser while allowing the demand signals to continue to flow from the remaining dispensers.

* * * * *